United States Patent
Gupta et al.

(10) Patent No.: US 9,653,071 B2
(45) Date of Patent: May 16, 2017

(54) METHOD AND SYSTEM FOR THE CORRECTION-CENTRIC DETECTION OF CRITICAL SPEECH RECOGNITION ERRORS IN SPOKEN SHORT MESSAGES

(71) Applicant: Honda Motor Co., Ltd., Tokyo (JP)

(72) Inventors: Rakesh Gupta, Mountain View, CA (US); Teruhisa Misu, Mountain View, CA (US); Aasish Pappu, Pittsburgh, PA (US)

(73) Assignee: Honda Motor Co., Ltd., Tokyo (JP)

(*) Notice: Subject to any disclaimer, the term of this patent is extended or adjusted under 35 U.S.C. 154(b) by 99 days.

(21) Appl. No.: 14/465,890

(22) Filed: Aug. 22, 2014

(65) Prior Publication Data

US 2015/0228272 A1 Aug. 13, 2015

Related U.S. Application Data

(60) Provisional application No. 61/937,492, filed on Feb. 8, 2014.

(51) Int. Cl.
| | | |
|---|---|---|
| *G10L 15/22* | (2006.01) | |
| *G10L 15/08* | (2006.01) | |
| *G10L 15/14* | (2006.01) | |
| *G10L 15/32* | (2013.01) | |

(52) U.S. Cl.
CPC .............. *G10L 15/14* (2013.01); *G10L 15/32* (2013.01)

(58) Field of Classification Search
CPC ................................ G10L 15/22; G10L 15/08
See application file for complete search history.

(56) References Cited

U.S. PATENT DOCUMENTS

| | | |
|---|---|---|
| 7,216,079 B1 | 5/2007 | Barnard et al. |
| 7,315,818 B2 | 1/2008 | Stevens et al. |
| 7,386,454 B2 | 6/2008 | Gopinath et al. |
| 7,421,387 B2 | 9/2008 | Godden |

(Continued)

OTHER PUBLICATIONS

Bergstra, James, and Yoshua Bengio. "Random search for hyper-parameter optimization." Journal of Machine Learning Research Feb. 13, 2012: 281-305.*

(Continued)

*Primary Examiner* — Michael N. Opsasnick
*Assistant Examiner* — Bryan Blankenagel
(74) *Attorney, Agent, or Firm* — Rankin, Hill & Clark LLP

(57) ABSTRACT

A method and system are disclosed for recognizing speech errors, such as in a spoken short messages, using an audio input device to receive an utterance of a short message, using an automated speech recognition module to generate a text sentence corresponding to the utterance, generating an N-best list of predicted error sequences for the text sentence using a linear-chain conditional random field (CRF) module, where each word of the text sentence is assigned a label in each of the predicted error sequences, and each label is assigned a probability score. The predicted error sequence labels are rescored using a metacost matrix module, the best rescored error sequence from the N-best list of predicted error sequences is selected using a Recognition Output Voting Error Reduction (ROVER) module, and a dialog action is executed by a dialog action module based on the best rescored error sequence and the dialog action policy.

18 Claims, 8 Drawing Sheets

(56) References Cited

U.S. PATENT DOCUMENTS

| | | | |
|---|---|---|---|
| 7,756,710 B2 | 7/2010 | Franco et al. | |
| 8,214,213 B1* | 7/2012 | Ljolje | G10L 15/063 704/243 |
| 8,355,920 B2 | 1/2013 | Gopinath et al. | |
| 8,428,950 B2 | 4/2013 | Onishi et al. | |
| 2004/0024601 A1* | 2/2004 | Gopinath | G10L 15/22 704/270 |
| 2005/0203751 A1* | 9/2005 | Stevens | G10L 15/22 704/276 |
| 2006/0149544 A1* | 7/2006 | Hakkani-Tur | G10L 15/22 704/236 |
| 2006/0173916 A1* | 8/2006 | Verbeck Sibley | G06F 17/30035 |
| 2006/0212293 A1* | 9/2006 | Tur | G10L 15/065 704/244 |
| 2006/0271364 A1* | 11/2006 | Mirkovic | G06F 17/28 704/239 |
| 2007/0271088 A1* | 11/2007 | Waibel | G06F 17/275 704/9 |
| 2008/0167872 A1* | 7/2008 | Okimoto | G10L 15/22 704/251 |
| 2008/0215320 A1* | 9/2008 | Wu | 704/231 |
| 2010/0004920 A1* | 1/2010 | Macherey | G06F 17/2818 704/4 |
| 2010/0042561 A1* | 2/2010 | Abe | G06N 99/005 706/12 |
| 2010/0179803 A1* | 7/2010 | Sawaf | G06F 17/28 704/2 |
| 2012/0036130 A1* | 2/2012 | Light | 707/736 |
| 2012/0173244 A1* | 7/2012 | Kwak | G10L 15/22 704/275 |
| 2012/0254143 A1* | 10/2012 | Varma | G06F 17/30401 707/706 |
| 2012/0303371 A1* | 11/2012 | Labsky | G10L 13/08 704/260 |

OTHER PUBLICATIONS

Mangu, Lidia, Brill, Eric, and Stolcke, Andreas. "Finding Consensus Among Words: Lattice-Based Word Error Minimization." SRI International Sep. 1999.*

"Grid Search: Searching for estimator Parameters." Scikit-learn.org.*

Article: http://research.microsoft.com/pubs/156769/0004681.pdf, Wang, et al.: "Template Constrained Posterior for Verifying Phone Transcriptions", Apr. 2008, 4 pages.

Article: http://www.itl.nist.gov/iad/mig/publications/proceedings/darpa99/html/sp220/sp220.htm, Pitz, et al.: "Automatic Transcription Verification of Broadcast news and Similar Corpora", printed Aug. 21, 2014, 5 pages.

* cited by examiner

METHOD AND SYSTEM FOR THE CORRECTION-CENTRIC DETECTION OF CRITICAL SPEECH RECOGNITION ERRORS IN SPOKEN SHORT MESSAGES

RELATED APPLICATIONS

This application claims priority to U.S. Provisional Application Ser. No. 61/937,492 filed on Feb. 8, 2014, which is incorporated by reference herein.

BACKGROUND

Texting while driving is dangerous to road safety. Recent advances in automatic speech recognition have enabled voice based texting as an alternative to typing a text message. However, automatic speech recognition systems are often prone to producing messages with errors. Some of these errors have a larger impact on the meaning of a message than others.

BRIEF DESCRIPTION

According to one aspect, a computer implemented method for speech recognition error detection includes receiving an utterance from an audio input device, generating a text sentence of one or more words based on the utterance, and generating a N-best list of predicted error sequences of the text sentence. Each of the one or more words of the text sentence is assigned a label in the N-best list of predicted error sequences. The method includes rescoring each label of the N-best list of predicted error sequences, and selecting a best rescored error sequence from the N-best list of predicted error sequences based on the rescored labels.

According to another aspect, a non-transitory computer-readable storage medium storing executable code for speech recognition error detection is provided. The code, when executed, performs the actions of receiving an utterance from an audio input device, generating a text sentence of one or more words based on the utterance, and generating a N-best list of predicted error sequences of the text sentence. Each of the one or more words of the text sentence is assigned a label in the N-best list of predicted error sequences. The actions include rescoring each label of the N-best list of predicted error sequences, and selecting a best rescored error sequence from the N-best list of predicted error sequences based on the rescored labels.

According to yet another aspect, a speech recognition error detection system is provided. The system includes a computer processor and a computer readable storage medium storing executable code. The code, when executed by the processor performs actions including receiving an utterance from an audio input device, generating a text sentence based on the utterance using an automated speech recognition module, and generating a N-best list of predicted error sequences of the generated text sentence using a linear-chain conditional random field (CRF) module. Each word of the text sentence is assigned a label in the N-best list of predicted error sequences using the CRF module. The actions include rescoring the labels of the N-best list of predicted error sequences using a metacost matrix module, and selecting a best rescored error sequence from the N-best list of predicted error sequences using a Recognition Output Voting Error Reduction (ROVER) module.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
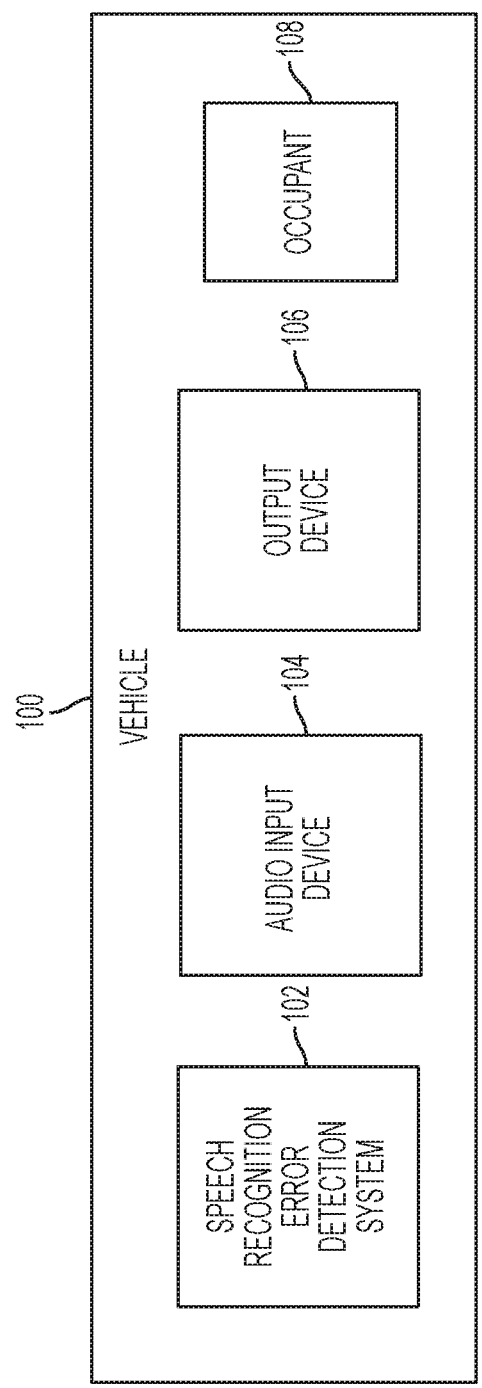
FIG. 1 is a schematic view of a vehicle having a speech recognition error detection system in accordance with an embodiment of the present application.

Embodiments are now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

A "database", as used herein can refer to table, a set of tables, a set of data stores and/or methods for accessing and/or manipulating those data stores.

An "output device" as used herein can include devices that can derive from vehicle components, systems, subsystems, and electronic devices. The term "output devices" includes, but is not limited to: display devices, and other devices for outputting information and functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). Additionally, the term "vehicle" can refer to an autonomous vehicle and/or self-driving vehicle powered by any form of energy. The autonomous vehicle may or may not carry one or more human occupants.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus can be specially constructed for the purposes, e.g., a specific computer, or it can comprise a general-purpose computer selectively activated or reconfigured by a computer program stored in the computer. Such a computer program can be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the method steps. The structure for a variety of these systems will appear from the description below. In addition, the embodiments are not described with reference to any particular programming language. It will be appreciated that a variety of programming languages can be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

I. Speech Recognition Error Detection System

Referring now to the drawings, wherein the showings are for purposes of illustrating one or more exemplary embodiments and not for purposes of limiting same, FIG. 1 illustrates a schematic view of a vehicle 100 having a speech recognition error detection system 102 in accordance with an embodiment of the present application. In an exemplary embodiment, the speech recognition error detection system 102 determines the presence of errors in the processing of a short message included in an utterance spoken by an occupant 108 and received through an audio input device 104. The speech recognition error detection system 102 executes a dialog action using an output device 106 based on the number and/or type of determined errors in a text sentence generated from the utterance and a dialog action policy. In one embodiment, the utterance can include a short message spoken by the occupant 108 of the vehicle 100. However, in other embodiments, the utterance received by the audio input device 104 can be a short message outputted by an audio generating device, such as, but not limited to, a cell phone or portable music device. The vehicle 100 can include components other than those illustrated in FIG. 1, and some components of the vehicle 100, such as the engine, tires, and suspension, are omitted from FIG. 1 for brevity purposes.

Figure 2:
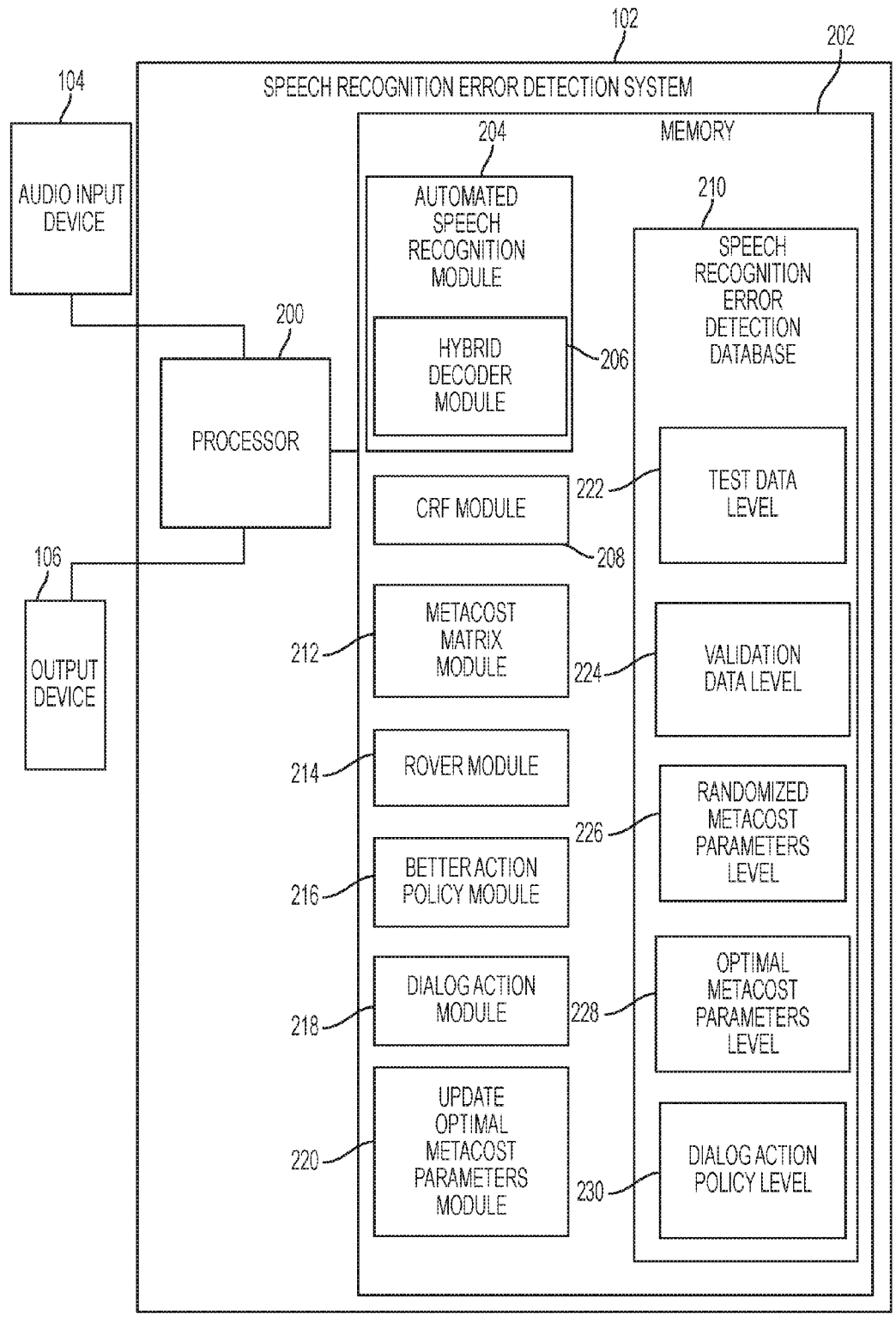
FIG. 2 is a detailed schematic view of the speech recognition error detection system of FIG. 1 in accordance with an embodiment of the present application.

FIG. 2 illustrates a schematic view of the speech recognition error detection system 102 of FIG. 1 in accordance with an embodiment of the present application, which will be described with reference to the elements of FIG. 1. The speech recognition error detection system 102 is connected to the audio input device 104 and the output device 106. The speech recognition error detection system 102 includes a computer processor 200 and a memory 202. The speech recognition error detection system 102 includes features, such as communication interfaces to the audio input device 104 and the output device 106. However, illustration of these features has been omitted for brevity purposes. In other embodiments, the speech recognition error detection system 102 may also include additional features other than those illustrated in FIGS. 1 and 2.

In one embodiment, the processor 200 processes data signals and can comprise various computing architectures including, but not limited to, a complex instruction set computer (CISC) architecture, a reduced instruction set computer (RISC) architecture, or an architecture implementing a combination of instruction sets. Although only a single processor is shown in FIG. 2, multiple processors can be included. The processor 200 can comprise an arithmetic logic device, a microprocessor, or some other information appliance equipped to transmit, receive, and process non-transitory electronic data signals from the memory 202, the audio input device 104 and the output device 106.

In one embodiment, the memory 202 stores instructions and/or data that can be executed by the processor 200. The instructions and/or data can comprise code (e.g. modules and/or databases) for performing all of the techniques described herein. In one embodiment, the memory 202 includes an automated speech recognition module 204 including a hybrid decoder module 206, a linear-chain conditional random field (CRF) module 208, a speech recognition error detection database 210, a metacost matrix module 212, a Recognition Output Voting Error Reduction (ROVER) module 214, a better action policy module 216, a dialog action module 218, and an update optimal metacost parameters module 220. The speech recognition error detection database 210 includes a test data level 222 including test data, a validation data level 224 including validation data, a randomized metacost parameters level 226 including randomized metacost parameters, an optimal metacost parameters level 228 including optimal metacost parameters, and a dialog action policy level 230 including a dialog action policy.

In other embodiments, other modules and databases than those shown in FIG. 2 can be used to perform the functionality described herein. For example, one or more of the test data level 222, the validation data level 224, the randomized metacost parameters level 226, the optimal metacost parameters level 228, or the dialog action policy level 230 can be included in a database other than the speech recognition error detection database 210 of speech recognition error detection system 102. In one embodiment, the speech recognition error detection database 210 can be hosted locally, such as in the memory 202 of the speech recognition error detection system 102. In other embodiments, the speech recognition error detection database can be hosted remotely from the speech recognition error detection system 102 and/or tied to another application. The modules and databases of the speech recognition error detection system 102 are adapted to communicate, via a bus (not shown), with the processor 200, the speech recognition error detection system 102, the audio input device 104, and the output device 106.

In one embodiment, the test data level 222 includes test data, including conversational texts or conversational data, from, for example, social media platforms and/or other messaging platforms. The validation data level 224 includes validation data, which is a subset of the test data from the test data level 222. In one embodiment, the validation data included in validation data level 224 is 30% of the test data from the test data level 222. In other embodiments, other percentages of test data from the test data level 222 can be used as validation data in the validation data level 224.

In one embodiment, the automated speech recognition module 204 receives the utterance including a short message from one of the occupants 108 of the vehicle 100. The automated speech recognition module 204 with the hybrid decoder module 206 analyzes the utterance and generates a text sentence based on the utterance. In one embodiment, the CRF module 208 uses test data from the test data level 222 to generate a lattice of all the possible combinations of labels for each word of the text sentence generated by the automated speech recognition module 204. In another embodiment, the CRF module 208 uses test data from the test data level 222 and validation data from the validation data level 224 to generate a lattice of all the possible combinations of labels for each word of the text sentence generated by the automated speech recognition module 204. The CRF module 208 generates an N-best list of predicted error sequences for the text sentence. Each of the error sequences include one or more individual labels that corresponds to each of the one or more words of the text sentence. Each label in the predicted error sequences, individually assigned to each of the words of the generated text sentence on a word-by word basis, indicates whether the corresponding word in the generated text sentence was correctly recognized by the automated speech recognition module 204. When the corresponding word in the generated text sentence was incorrectly recognized by the automated speech recognition module 204, the label for the incorrectly recognized word in the generated text sentence also indicates whether the inaccuracy in the generated text sentence will result in a misinterpretation of the short message in the utterance.

The labels of the N-best list of predicted error sequences are assigned to each word of the text sentence. Each label is a major error label, minor error label, or correct label. The CRF module 208 also assigns a probability score to each label, which is indicative of the probability of the accuracy of the label. In some embodiments, the CRF module 208 is implemented with the hybrid decoder module 206 for assigning probabilities. The scores are assigned by the CRF module 208 using a weighted sum of at least two word features. The word features include at least one of lexical, automated speech recognition, syntactic, and subword features, which are described in detail below in conjunction with FIG. 5. The CRF module 208 selects the N-best error sequences based on the combined label scores for each error sequence.

In one embodiment, the metacost matrix module 212 rescores the labels of the N-best list of predicted error sequences, generated by CRF module 208, using a randomized grid search. Further, in one embodiment, the ROVER module 214 selects the best rescored error sequence from the rescored N-best list of predicted error sequences, which were rescored by the metacost matrix module 212.

Additionally, in one embodiment, during the training of the metacost matrix module 212, the better action policy module 216 determines the dialog action for the selected best rescored error sequence based on the dialog action policy of the dialog action policy level 230 and the number and types of error labels in the best rescored error sequence. The severity of a dialog action is determined by the likelihood of the dialog action resulting in a change to the words of the text sentence generated by the automated speech recognition module 204. The determined dialog action dictates the actions taken by the speech recognition error detection system 102 and/or the speech recognition error detection method 300 with regard to the words of the text sentence generated by the automated speech recognition module 204. The dialog action policy level 230 includes the dialog actions of "confirm", "repeat", and "continue". Other embodiments of dialog action policy level 230 can include different or additional dialog actions.

The dialog action of "confirm" is more severe than the dialog action of "continue", since the dialog action of "confirm" can result in a change to the words of the generated text sentence when compared to the "continue" dialog action, which implicitly confirms that the generated text sentence is correct and commences sending, delivering, and/or posting the text sentence. The dialog action of "repeat" is more severe than the dialog action of "confirm", since the dialog action of "repeat" will result in a change to the words of the generated text sentence, since the dialog action of "repeat" disregards the generated text sentence. Therefore, the dialog action of "repeat" is more likely to result in a change to the words of the generated text sentence when compared to the "confirm" dialog action. The severity of a dialog action increases as the likelihood of the dialog action changing the words of the generated text sentence increases.

The better action policy module 216 compares the severity of the selected dialog action of the best rescored error sequence with the severity of a previously selected dialog action of the previously selected best error sequence. In one embodiment, the update optimal metacost parameters module 220 applies a small random adjustment to the optimal metacost parameters from the optimal metacost parameters level 228, when the better action policy module 216 determines that the selected dialog action of the best rescored error sequence is more severe than a previously selected dialog action policy of the previously selected best rescored error sequence.

Figure 4:
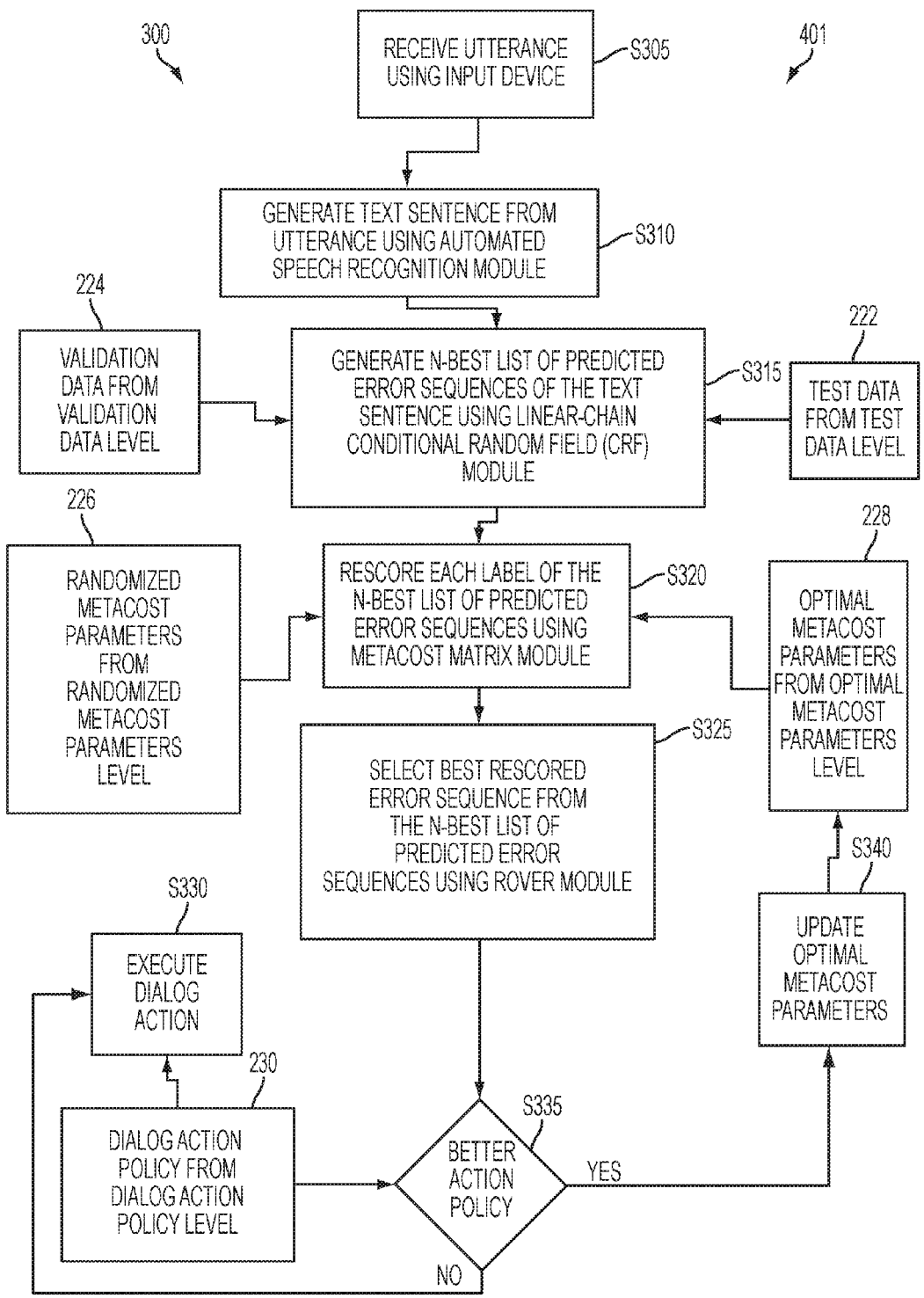
FIG. 4 is a process flow diagram of a training phase of the speech recognition error detection method of FIG. 3 in accordance with an embodiment of the present application.

For example, in one embodiment, the better action policy module 216 applies a small random adjustment to the optimal metacost parameters from the optimal metacost parameters level 228 when the better action policy module 216 selects a dialog action of "repeat" for the selected best error sequence during a current iteration of the training phase 401 of the speech recognition error detection method 300 shown in FIG. 4, and the dialog action of "correct" was selected by the better action policy module 216 for the previously selected best error sequence during the previous iteration of the training phase 401 of the speech recognition error detection method 300. However, the better action policy module 216 does not apply a small random adjustment to the optimal metacost parameters of the optimal metacost parameters level 228 when the better action policy module selects a dialog action of "confirm" for the selected best error sequence during a current iteration of the training phase 401 of the speech recognition error detection method 300, and the dialog action of "repeat was selected by the better action policy module 216 for the previously selected best error sequence during the previous iteration of the training phase 401 of the speech recognition error detection method 300. This is due to the fact that, in this example, the dialog action of "repeat" is more severe than the dialog action of "correct", but the dialog action of "confirm" is not more severe than the dialog action of "repeat".

II. Speech Recognition Error Detection Method

Figure 3:
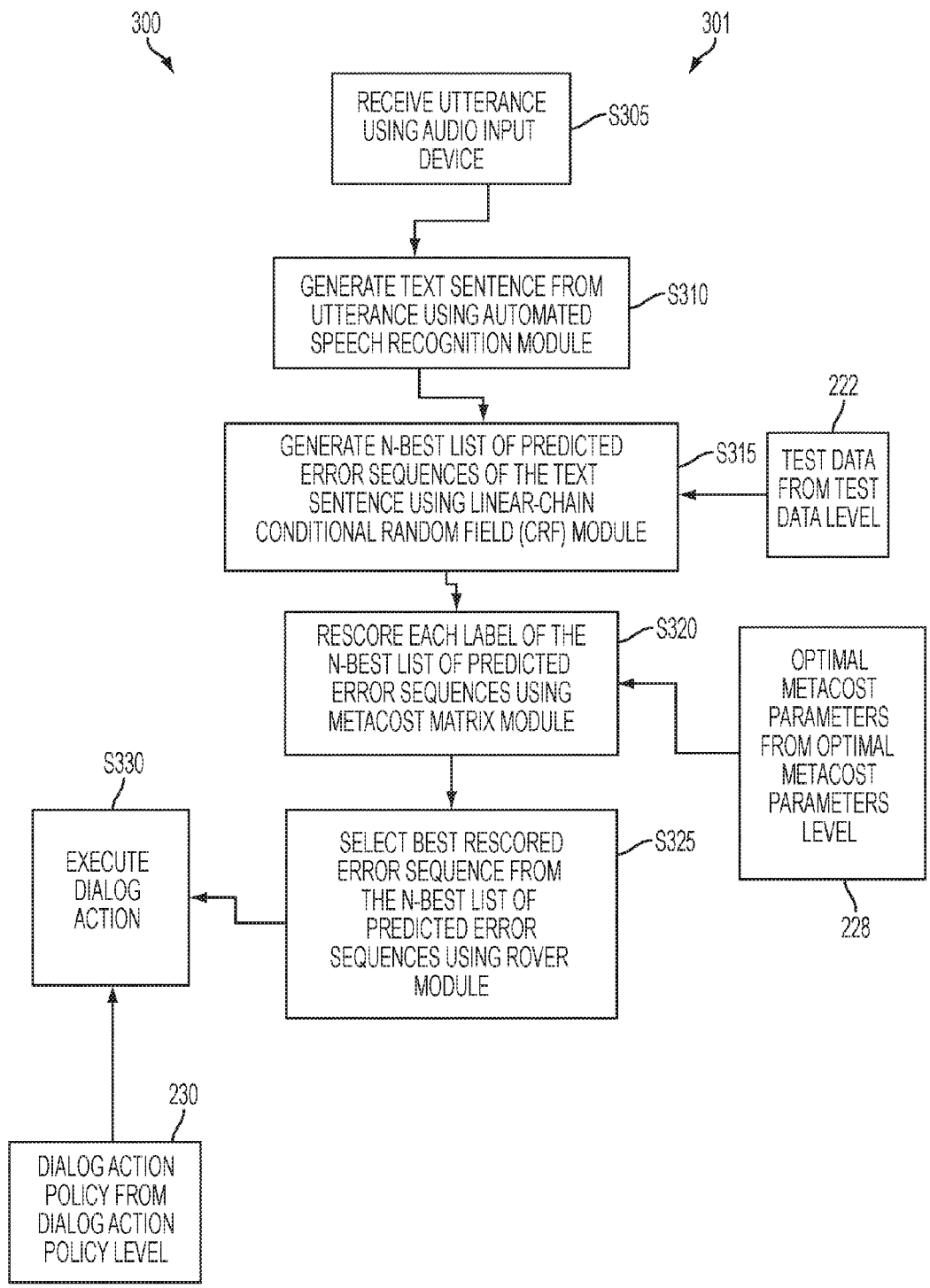
FIG. 3 is a process flow diagram of an evaluation phase of a speech recognition error detection method in accordance with an embodiment of the present application.

FIG. 3 is a process flow diagram of an evaluation phase 301 of a speech recognition error detection method 300 in accordance with an embodiment of the present application, which will be described with reference to FIGS. 1 and 2. However, the method of FIG. 3 can also be used with other systems and embodiments besides those of FIGS. 1 and 2, such as other short messaging platforms.

In block S305, the speech recognition error detection method 300 includes receiving an utterance from the audio input device 104. The utterance can include a short message, which can be received using the audio input device 104. In one embodiment, the utterance can be words spoken by the occupant 108 of the vehicle 100. In another embodiment, the utterance can be sound generated by an electronic device, such as a cell phone or music player. At block S310, the speech recognition error detection method 300 includes generating a text sentence of one or more words based on the utterance. In one embodiment, the automated speech recognition module 204 generates the text sentence including one or more words based on the utterance received from the audio input device 104 at block S305.

At block S315, the speech recognition error detection method 300 includes generating an N-best list of predicted error sequences of the text sentence of block S310, wherein each of the one or more words of the text sentence is assigned a label in the N-best list of predicted error sequences. In one embodiment, the N-best list of predicted error sequences for the text sentence is generated using the CRF module 208. The test data from the test data level 222 is used by the CRF module 208 to generate the N-best list of predicted error sequences for the text sentence. Each of the error sequences of the N-best list of predicted error sequences includes a label that corresponds to each of the one or more words of the generated text sentence. The label assigned to each word of the N-best list of predicted error sequences is one of a major error label, a minor error label, or a correct label. A probability score is calculated for and assigned to each label of the N-best list of predicted error sequences by the CRF module 208. The probability score assigned to each label of the N-best list of predicted error sequences in block S315 indicates the probability of the accuracy of the label. The generation of the N-best list of predicted error sequences is further described in FIGS. 5-8.

At block S320, the speech recognition error detection method 300 includes rescoring each label of the N-best list of predicted error sequences of block S315. In one embodiment, the labels of the one or more words of the N-best list of predicted error sequences for the text sentence are rescored using the metacost matrix module 212. The metacost matrix module 212 uses a metacost matrix with the optimal metacost parameters from the optimal metacost parameters level 228 to rescore the labels of the N-best list of predicted error sequences. The rescoring of the labels of the N-best list of predicted error sequences is further described in FIGS. 9-10.

At block S325, the speech recognition error detection method 300 includes selecting a best rescored error sequence from the N-best list of predicted error sequences based on the rescored labels of block S320. In one embodiment, the Recognizer Output Voting Error Reduction system (ROVER) is used by the ROVER module 214 to select the best rescored error sequence from the rescored N-best list of predicted error sequences.

At block S330, the speech recognition error detection method 300 includes executing a dialog action based on the best rescored error sequence of block S325 and a dialog action policy. The dialog action policy indicates the dialog action based on the rescored labels of the best rescored error sequence.

In one embodiment, the dialog action module 218 executes a dialog action included within the dialog action policy level 230. The dialog action executed by dialog action module 218 is indicated, based on the dialog actions included within the dialog action policy level 230 and the number and types of error labels in the best rescored error sequence. The dialog action policy level 230 includes the dialog actions of "confirm", "repeat", and "continue". The dialog action of "confirm" is more severe than the dialog action of "continue", and the dialog action of "repeat" is more severe than the dialog action of "confirm".

The dialog action of "continue" is executed at block S330 when there are no major error labels present in the best rescored error sequence. Specifically, the dialog action of "continue" occurs when there are only minor error labels present or no error labels present in the best rescored error sequence. The dialog action of "continue" implicitly confirms that the generated text sentence is correct and commences sending, delivering, and/or posting the text sentence.

At block S330, the speech recognition error detection method 300 includes executing the dialog action determined by the dialog action policy. The dialog action policy indicates the dialog action of playing back at least a portion of the text sentence and requesting a confirmation of accuracy, when the best rescored error sequence includes the major error label. In one embodiment, this dialog action of "confirm" is executed at block S330 when one major error in present in the best rescored error sequence, as indicated by the labels of the best rescored error sequence. The dialog action of "confirm" plays back the portion of the generated text sentence that corresponds with the major error label present in the best rescored error sequence through the output device 106. The dialog action of "confirm" then requests confirmation as to whether the played back portion of the generated text sentence is accurate, and receives confirmation as to whether the played back portion of the generated text sentence is accurate through the audio input device 104. The confirmation can be requested from and provided by an occupant 108 in the vehicle 100. The sending, delivering, and/or posting of the text sentence is commenced, when the played back portion is confirmed as accurate. The speech recognition error detection system 102 requests the occupant 108 to repeat the utterance that corresponds to the played back portion of the text sentence, when the played back portion of the text sentence is confirmed as inaccurate.

Further, at block S330, the speech recognition error detection method 300 includes executing the dialog action determined by the dialog action policy, and the dialog action policy indicates the dialog action of discarding the text sentence and requesting a repeat of the utterance, when the best rescored error sequence includes at least two of the major error labels. In one embodiment, the dialog action of "repeat" discards the generated text sentence and requests a repeating of the utterance using the output device 106. For example, the request of repeating the utterance using the output device 106 can be a verbal message spoken to the user (e.g. occupant 108) and/or a message that is displayed on a screen to the user (e.g. occupant 108). The method then returns to block S305, where the repeated utterance is received using the audio input device 104.

FIG. 4 is a process flow diagram of a training phase 401 of the speech recognition error detection method 300 of FIG. 3 in accordance with an embodiment of the present application, which will be described with reference to FIGS. 1-3. However, the training phase 401 of the speech recognition error detection method 300 of FIG. 4 can also be used with other systems and embodiments, besides those of FIGS. 1-3, such as other short messaging platforms. The training phase 401 of the speech recognition error detection method 300 illustrated in FIG. 4 includes additional aspects beyond those of the evaluation phase 301 of the speech recognition error detection method 300 illustrated in FIG. 3, namely the use of validation data from the validation data level 224 by the CFR module 208, the use of randomized metacost parameters from the randomized metacost parameters level 226 by the metacost matrix module 212, the use of the better action policy module 216 in block S335 to determine if the optimal metacost parameters from the optimal metacost parameters level 228 need to be updated, and the use of the update optimal metacost parameters module 220 in block S340 to apply an adjustment to the optimal metacost parameters from the optimal metacost parameters level 228.

At block S305, the speech recognition error detection method 300 includes receiving an utterance from an audio input device 104. At block S310, the speech recognition error detection method 300 includes generating a text sentence of one or more words based on the utterance. In one embodiment, the automated speech recognition module 204 generates the text sentence including one or more words based on the utterance of block S305. At block S315, the speech recognition error detection method 300 includes generating an N-best list of predicted error sequences of the text sentence of block S310. Each of the one or more words of the text sentence is assigned a label in the N-best list of predicted error sequences. In one embodiment, the N-best list of predicted error sequences for the text sentence is generated using the CRF module 208. The test data from the test data level 222 and the validation data of the validation data level 224 are used by the CRF module 208 to generate the N-best list of predicted error sequences for the text sentence. Each of the one or more words of the generated text sentence is assigned a label in each of the predicted error sequences of the N-best list of predicted error sequences. The labels of the predicted error sequences, assigned to each word of the generated text sentence is a major error label, minor error label, or correct label. A probability score is assigned to each label of the predicted error sequences. The probability score assigned to each label of the N-best list of predicted error sequences at block S315 indicates the probability of the accuracy of the label. The generation of the N-best list of predicted error sequences is further described in FIGS. 5-8.

At block S320, the speech recognition error detection method 300 includes rescoring each label of the N-best list of predicted error sequences of block S315. In one embodiment, the labels of the N-best list of predicted error sequences for the one or more words of the text sentence are rescored using the metacost matrix module 212. The metacost matrix module 212 uses a metacost matrix with the optimal metacost parameters from the optimal metacost parameters level 228 and the randomized metacost parameters from the randomized metacost parameters level 226 to rescore the labels of the N-best list of predicted error sequences. The rescoring of the N-best list of predicted error sequences is further described in FIGS. 9-10.

At block S325, the speech recognition error detection method 300 includes selecting a best rescored error sequence from the N-best list of predicted error sequences based on the rescored labels of block S320. In one embodiment, the Recognizer Output Voting Error Reduction system (ROVER) is used by the ROVER module 214 to select the best rescored error sequence from the rescored N-best list of predicted error sequences.

At block S335, the speech recognition error detection method 300 includes comparing a dialog action of the best rescored error sequence determined by the dialog action policy at block S325 to a dialog action of a previously selected best rescored error sequence determined by the dialog action policy. In one embodiment, the better action policy module 216 determines the dialog action for the selected best rescored error sequence based on the dialog action policy of the dialog action policy level 230 and the number and types of error labels in the best rescored error sequence at block S335. The dialog action policy level 230 includes the dialog actions of "confirm", "repeat", and "continue".

The better action policy module 216 also compares the dialog action determined during the current iteration of the speech recognition error detection method 300 for the selected best rescored error sequence with the dialog action determined during the previous iteration of the speech recognition error detection method 300 for the previously selected best rescored error sequence. The processor 200 maintains the iteration count of the speech recognition error detection method 300. The speech recognition error detection method 300 proceeds from block S335 to block S330, when the dialog action determined during the current iteration is not more severe than the dialog action determined during the previous iteration of the speech recognition error detection method 300 of recognizing errors in a short message. The speech recognition error detection method 300 proceeds from block S335 to block S340, when the dialog action determined during the current iteration is more severe than the dialog action determined during the previous iteration of the speech recognition error detection method 300. During the first iteration of the speech recognition error detection method 300, the dialog action determined during the previous iteration is initialized as "continue", the least severe dialog action. Therefore, the speech recognition error detection method 300 will proceed from block S335 to block S340, when the dialog action determined during the first iteration of the method 300 is "confirm" or "repeat", which are both more severe than "continue". Otherwise, the speech recognition error detection method 300 will proceed from block S335 to block S330, when the dialog action determined during the first iteration of the method 300 is "continue".

At block S340, the speech recognition error detection method 300 includes updating the optimal metacost parameters, when the dialog action of the best rescored error sequence of block S325 is more severe than the dialog action of the previously selected best rescored error sequence determined by the dialog action policy. In one embodiment, the update optimal metacost parameters module 220 is used to update the optimal metacost parameters of the optimal metacost parameters level 228. The update optimal metacost parameters module 220 updates the optimal metacost parameters by applying a small random adjustment to the optimal metacost parameters. The speech recognition error detection method 300 proceeds to block S320 after the update optimal metacost parameters module 220 applies the small random adjustment to the optimal metacost parameters of the optimal metacost parameters level 228.

At block S330, the speech recognition error detection method 300 includes executing a dialog action based on the best rescored error sequence of block S325 and a dialog action policy, wherein the dialog action policy indicates the dialog action based on the rescored labels of the best rescored error sequence. In one embodiment, the dialog action module 218 executes the dialog action determined by the better action policy module 216, based on the dialog actions included within the dialog action policy level 230 and the number and types of error labels in the best rescored error sequence.

The dialog action of "continue" is executed at block S330 when there are no error labels present in the best rescored error sequence, or only minor error labels present in the best rescored error sequence. The dialog action of "continue" implicitly confirms that the generated text sentence is correct and commences sending, delivering, and/or posting the text sentence.

At block S330, the speech recognition error detection method 300 includes executing the dialog action determined by the dialog action policy, and wherein the dialog action policy indicates the dialog action of playing back at least a portion of the text sentence and requesting a confirmation of accuracy when the best rescored error sequence includes the major error label. In one embodiment, this dialog action of "confirm" is executed at block S330 when one major error in present in the best rescored error sequence, as indicated by the labels of the best rescored error sequence. The dialog action of "confirm" plays back the portion of the generated text sentence that corresponds with the major error label present in the best rescored error sequence through the output device 106, requests confirmation as to whether the played back portion of the generated text sentence is accurate, and receives confirmation as to whether the played back portion of the generated text sentence is accurate through the audio input device 104. The sending, delivering, and/or posting of the text sentence is commenced, when the played back portion is confirmed as accurate. The speech recognition error detection system 102 requests a repeating of the utterance that corresponds to the played back portion of the text sentence, when the played back portion of the text sentence is confirmed as inaccurate.

Further, at block S330, the speech recognition error detection method 300 includes executing the dialog action determined by the dialog action policy, and the dialog action policy indicates the dialog action of discarding the text sentence and requesting a repeat of the utterance when the best rescored error sequence includes at least two of the major error labels. In one embodiment, this dialog action of "repeat" discards the generated text sentence and requests a repeating of the utterance using the output device 106. The method then returns to S305, where the repeated utterance is received using the audio input device 104.

During the training phase 401 of the speech recognition error detection method 300, validation data from validation data level 224 is used to train the CRF module 208 to more accurately label the words of the generated text sentence. Further, the training phase 401 of the speech recognition error detection method 300 trains the metacost matrix module 212 to more accurately label each word of the generated text sentence. During the training phase 401 of the speech recognition error detection method 300, the metacost matrix module 212 is trained using the randomized metacost parameters from the randomized metacost parameters level 226, in conjunction with the optimal metacost parameters from the optimal metacost parameters level 228.

Further, during the training phase 401 of the speech recognition error detection method 300, the optimal metacost parameters from the optimal metacost parameters level 228 are updated using the update optimal metacost parameters module 220. As was stated above, in one exemplary embodiment, the better action policy module 216 applies a small random adjustment to the optimal metacost parameters from the optimal metacost parameters level 228 when the better action policy module 216 selects a dialog action of "repeat" for the selected best error sequence during a current iteration of the training phase 401 of the speech recognition error detection method 300, and the dialog action of "correct" was selected by the better action policy module 216 for the previously selected best error sequence during the previous iteration of the training phase 401 of the speech recognition error detection method 300. However, the better action policy module 216 does not apply a small random adjustment to the optimal metacost parameters of the optimal metacost parameters level 228 when the better action policy module selects a dialog action of "confirm" for the selected best error sequence during a current iteration of the training phase 401 of the speech recognition error detection method 300, and the dialog action of "repeat" was selected by the better action policy module 216 for the previously selected best error sequence during the previous iteration of the training phase 401 of the speech recognition error detection method 300. This is due to the fact that, in this example, the dialog action of "repeat" is more severe than the dialog action of "correct", but the dialog action of "confirm" is not more severe than the dialog action of "repeat".

The training phase 401 of the speech recognition error detection method 300 is performed prior to deploying the speech recognition error detection system 102 in the field. The speech recognition error detection system 102 runs the evaluation phase 301 of the speech recognition error detection method 300 once deployed in the field, such as, in one embodiment, once the speech recognition error detection system 102 is assembled into the vehicle 100. Therefore, the speech recognition error detection method 300 can include both the evaluation phase 301 of FIG. 3 and the training phase 401 of FIG. 4.

Figure 5:
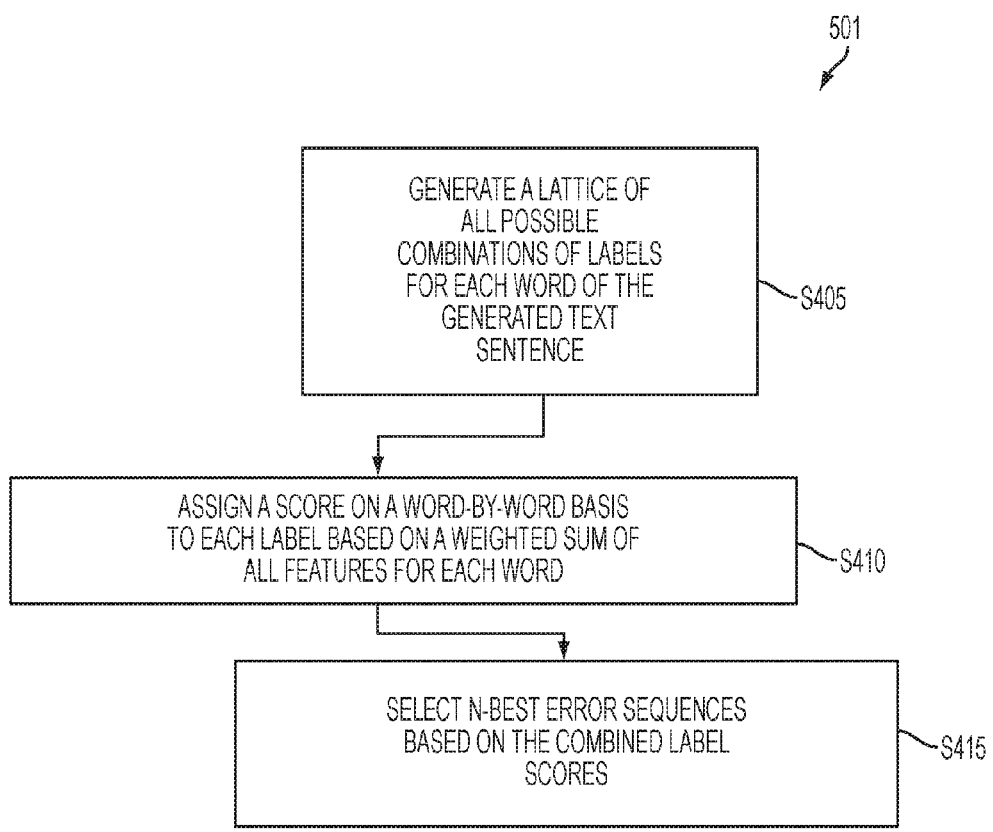
FIG. 5 is a process flow diagram of a method of generating an N-best list of predicted error sequences for the speech recognition error detection method of FIGS. 3 and 4 in accordance with an embodiment of the present application.

FIG. 5 is a process flow diagram of a method 501 of generating an N-best list of predicted error sequences for the speech recognition error detection method 300 of FIGS. 3 and 4 in accordance with an embodiment of the present application. FIG. 5 illustrates the details of block S315 for the speech recognition error detection method 300 of FIGS. 3 and 4. In block S405, an array of all the possible combinations of labels is created by the CRF module 208 for each word of the text sentence generated by the automated speech recognition module 204.

Figure 6:
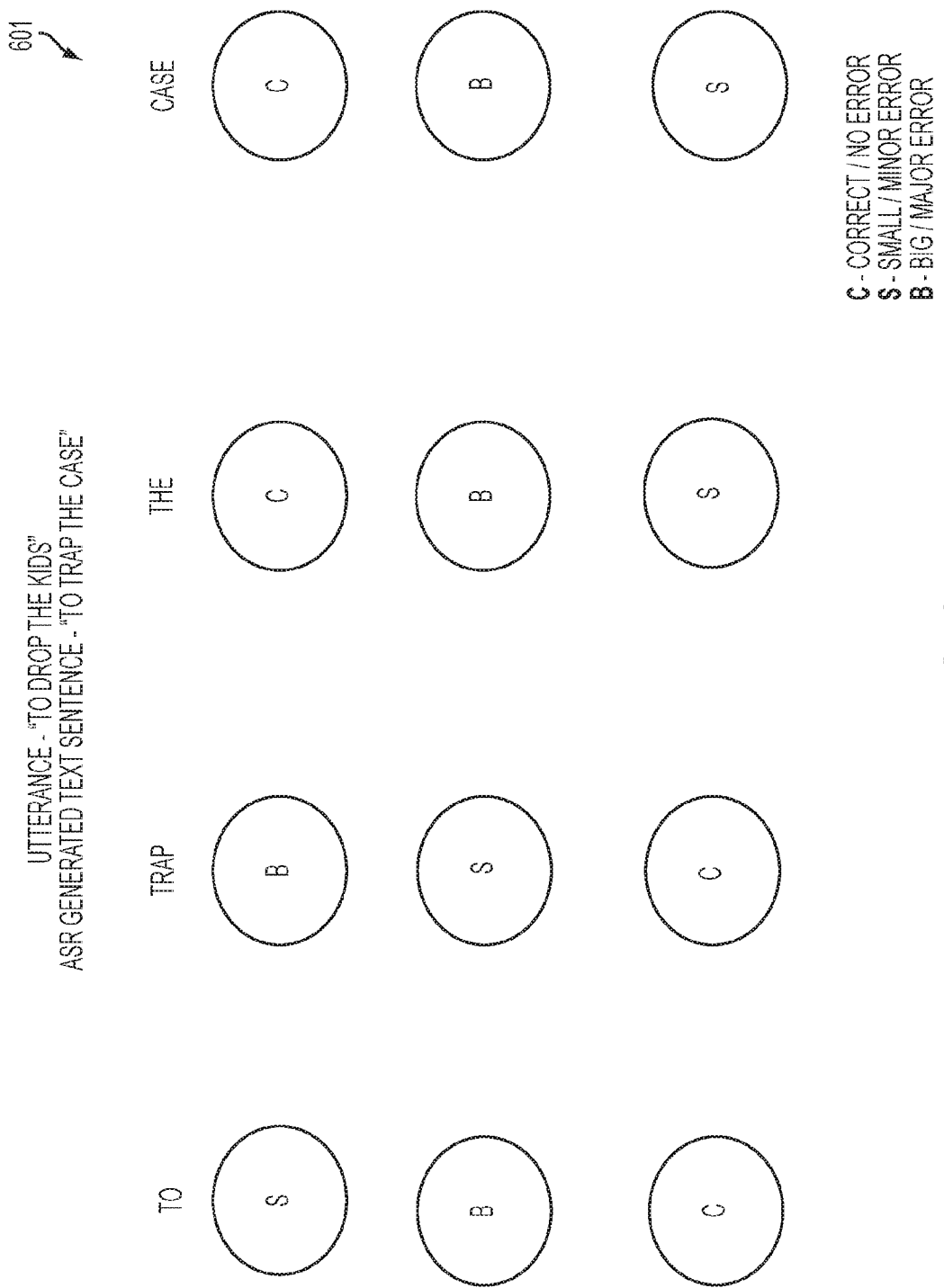
FIG. 6 is an illustrative example of an array of error sequence labels, for a text sentence, generated by the method of generating an N-best list of predicted error sequences of FIG. 5 in accordance with an embodiment of the present application.

FIG. 6 is an illustrative example of an array of error sequence labels 601, for the text sentence, generated by the method 501 of generating an N-best list of predicted error sequences of FIG. 5 in accordance with an embodiment of the present application. In the embodiment, the array of error sequence labels 601 can be generated by the CRF module 208. The array of error sequence labels 601 of FIG. 6 was generated for the text sentence "to trap the case", which was generated by the automated speech recognition module 204 based on the utterance "to drop the kids".

The array of error sequence labels 601 has a column for each word of the generated text sentence. Each column includes all of the possible labels. In the embodiment of the current application, the possible labels are "C", "B", and "S". The "C" (i.e., correct) label indicates that the corresponding word of the generated text sentence is classified as correct/no error. The "S" (i.e. small/minor error) label indicates that the corresponding word of the generated text sentence is classified as a small/minor error. The "B" (i.e., big/major error) label indicates that the corresponding word of the generated text sentence is classified as a major error. The label "C" indicates that the word of the generated sentence is accurate, when compared to the utterance. The label "S" indicates that the word of the generated text sentence is not accurate, when compared to the utterance, but the inaccuracy in the generated text sentence will not result in a misinterpretation of the short message in the utterance. The label "B" indicates that the word of the generated text sentence is not accurate, when compared to the utterance, and the inaccuracy in the generated text sentence will result in a misinterpretation of the short message in the utterance.

Returning to FIG. 5, at block S410 of the speech recognition error detection method 300, the label assigned to each word of the text sentence in the error sequences at block S405 has a probability score indicative of a probability that the label is accurate, wherein the probability score for the label is determined by a weighted sum of at least two word features. The word features can include lexical, automated speech recognition, syntactic, and/or subword features. The lexical features can include the word in the sentence that corresponds with the label and/or position of the word in the sentence (e.g. beginning, middle, or end). The automated speech recognition features include at least one of, a posterior confidence of the accuracy of the word in the text sentence generated by the automated speech recognition module 204, a duration of time for the word in the utterance, the presence of an ngram for the word in the text sentence in a language model (e.g. 3 gram, 2 gram, 1 gram, out of vocabulary), and a ratio of alternative nodes to a current node in a word confusion network. The syntactic features include at least one of, a part of speech tag for the word in the text sentence, a part of speech confidence for the word in the text sentence, and a chunk label for the word in the text sentence. The subword features include the presence of a subword detected in the timeframe of the output of the hybrid decoder module 206 of the automated speech recognition module 204.

In one embodiment, a score is assigned on a word-by-word basis to each individual label based on a weighted sum of all features for each word at block S410. The score for each label is indicative of the probability that the label is accurate. The scores are assigned by the CRF module 208 using a weighted sum of at least two word features.

In one embodiment, the CRF module 208 estimates and assigns the scores to the labels using Sphinx 3. More specifically, word level time and acoustic model scores are obtained, using Sphinx 3, by force aligning the utterance with the generated text sentence and other text sentence hypotheses produced by the automated speech recognition module 204. Next, the language model scores are obtained. More specifically, the SRI language model (SRI-LM) toolkit is used to obtain the language model scores by measuring the perplexity of the generated text sentence and other text sentence hypotheses over a trigram language model. The language model scores can be used by the CRF module 208 to estimate the label scores. The language model can be trained on a dataset of tweets.

Next, a word confusion network (WCN) is generated using the generated text sentence and other text sentence hypotheses produced by the automated speech recognition module 204, word level acoustic model scores and word level language level scores. The resulting word confusion network includes the word level posterior probabilities, which can also be used by the CRF module 208 to estimate the label scores. The log-posterior probabilities of words in the generated text sentence can also be used by the CRF module 208 to estimate the label scores.

Further, a part of speech tag for each word is another feature that can be used by the CRF module 208 to estimate the label scores. The part of speech tag can be obtained for each word of the generated text sentence using speech tags. For example, these speech tags can include those that are provided by social media platforms and/or other messaging platforms. A chunk tag label for each word is another feature that can be used by the CRF module 208 to estimate the label scores. The chunk tag labels include, but are not limited to, noun, verb, pronoun, and adjective. The chunk tag labels can be obtained for each word of the generated text sentence using OPEN-NLP chunker. The chunk labels help to discriminate between errors and correct words since disfluent phrases, which indicate errors, lead to abrupt chunking when compared to fluent phrases.

Further, the presence of a subword in the time frame of the output of the hybrid decoder module 206 of the automatic speech recognition module 204 can also be used by the CRF module 208 to estimate the label scores. Major errors typically occur in place of open-class words and sometimes are out-of-vocabulary words for the automatic speech recognition module 204. A subword language model approach can be used to detect the presence of subwords as a binary feature in the error detection model of the CRF module 208. As is known in subword language models, a subword can be made up of syllables and phonemes. A subword is identified by first aligning a regular recognition hypothesis with a hybrid hypothesis as determined by the hybrid decoder module 206. A 1 is assigned to the subword tokens in the regular hypothesis that are aligned with a subword, otherwise a 0 is assigned to the subword tokens in the regular hypothesis that are not aligned with a subword. In one embodiment, the subword language model can be trained using tweets, where nouns and proper-nouns in the tweets are treated as out-of-vocabulary tokens.

Figure 7:
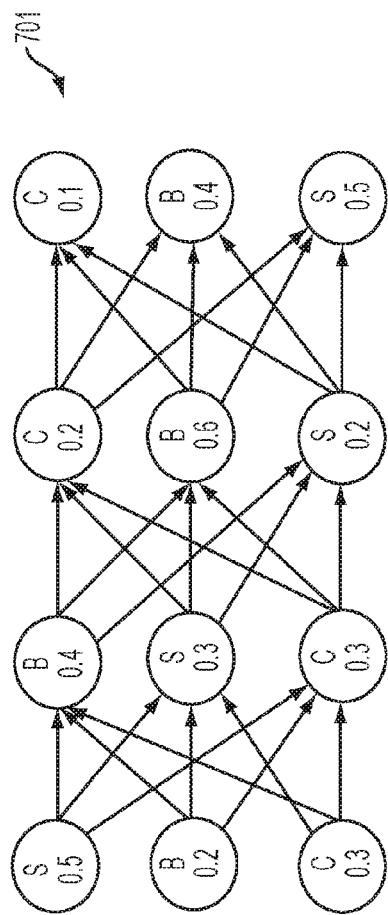
FIG. 7 is an illustrative example of a scored error sequence label lattice based on the array of error sequence labels of FIG. 6 in accordance with an embodiment of the present application.

FIG. 7 is an illustrative example of a scored error sequence label lattice 701 based on the array of error sequence labels 601 of FIG. 6 in accordance with an embodiment of the present application. In an exemplary embodiment, the scores calculated and assigned by the CRF module 208 for each of the labels in the first column of the scored error sequence label lattice 701 corresponding with the generated text sentence word "TO" are as follows: the score for "S" is 0.5; the score for "B" is 0.2; and the score for "C" is 0.3. The scores calculated and assigned by the CRF module 208 for each of the labels in the second column of the scored error sequence label lattice 701 corresponding with the generated text sentence word "TRAP" are as follows: the score for "B" is 0.4; the score for "S" is 0.3; and the score for "C" is 0.3. The scores calculated and assigned by the CRF module 208 for each of the labels in the third column of the scored error sequence label lattice 701 corresponding with the generated text sentence word "THE" are as follows: the score for "C" is 0.2; the score for "B" is 0.6; and the score for "S" is 0.2. The scores calculated and assigned by the CRF module 208 for each of the labels in the fourth column of the scored error sequence label lattice 701 corresponding with the generated text sentence word "CASE" are as follows: the score for "C" is 0.1; the score for "B" is 0.4; and the score for "S" is 0.5. Since the above listed scores for "B", "C", and "S" are exemplary, In other embodiments, the score for "B" can be a value other than 0.04, the score for "C" can be a value other than 0.1, and/or the score for "S" can be value other than 0.5.

Returning to FIG. 5, at block S410 the CRF module 208 estimates and assigns a score on a word-by-word basis to each individual label of the scored error sequence label lattice 701 based on a weighted sum of all features for each word. At block S415 the CRF module 208 selects the N-best list of error sequences based on the combined label scores.

Figure 8:
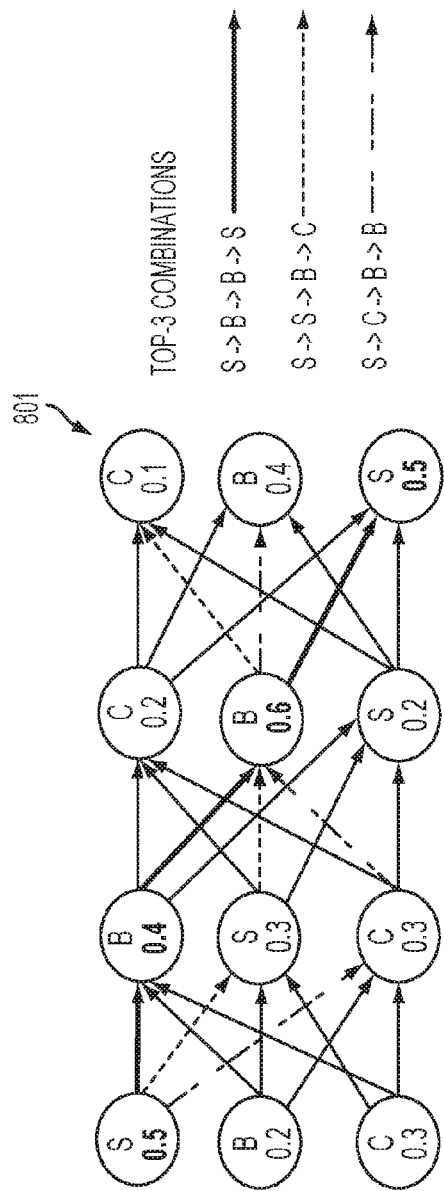
FIG. 8 is an illustrative example of an N-best list of error sequences in an N-best list of error sequences lattice for the scored error sequence label lattice of FIG. 7 in accordance with an embodiment of the present application.

FIG. 8 is an illustrative example of an N-best list of error sequences in an N-best list of error sequences lattice 801 for the scored error sequence label lattice 701 of FIG. 7 in accordance with an embodiment of the present application. The first error sequence of the N-best list of error sequences shown in the N-best list of error sequences lattice 801 is S→B→B→S. The second error sequence of the N-best list of error sequences lattice 801 is S→S→B→C. The third error sequence of the N-best list of error sequences lattice 801 is S→C→B→B. Even though the value of "N" is 3 for the N-best list error sequences in the N-best list of error sequences lattice 801, a different value for "N" can be used for the N-best list of error sequences in other embodiments of the speech recognition error detection method 300.

Figure 9:
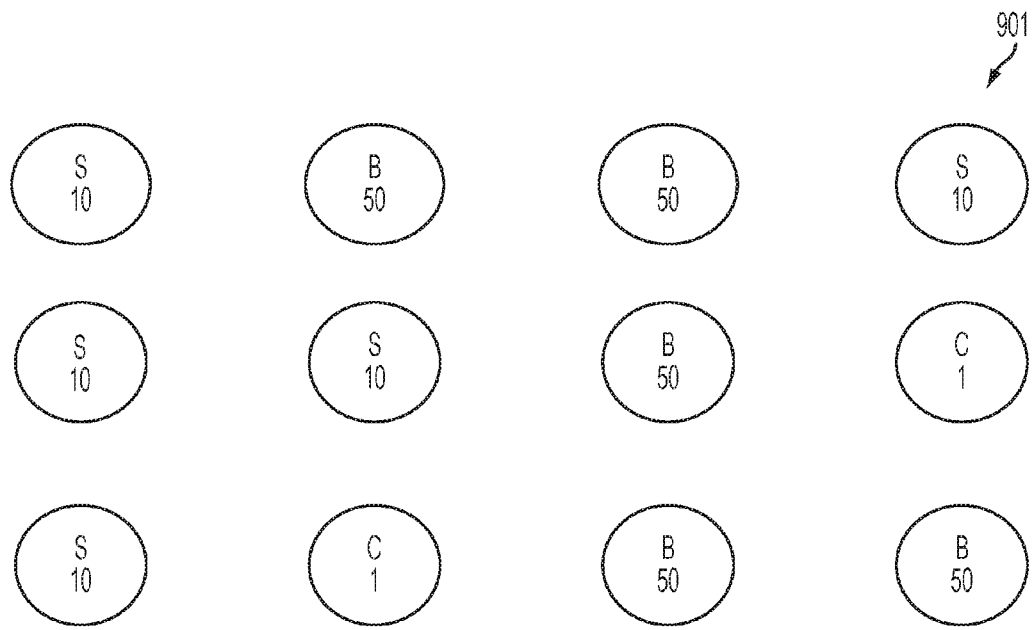
FIG. 9 is an illustrative example of an array of rescored labels for an N-best list of error sequences, based on the N-best list of error sequences lattice of FIG. 8 in accordance with an embodiment of the present application.

FIG. 9 is an illustrative example of an array of rescored N-best list error sequence labels 901 for an N-best list of error sequences, based on the N-best list of error sequences lattice 801 of FIG. 8 in accordance with an embodiment of the present application. With reference to FIGS. 3-4, FIG. 9 illustrates the rescoring of the labels for the N-best list of error sequences in the N-best list of error sequences lattice 801 using the metacost matrix module 212 of block S320. The metacost matrix module 212 applies a randomized grid search, such as SCIKIT-LEARN, to rescore each type of error sequences label in the N-best list of error sequences lattice 801. For example, in FIG. 9, all of the "C" labels are rescored as 1, all of the "5" labels are rescored as 10, and all of the "B" labels are rescored as 50 by the metacost matrix module 212. Even though each "C" is rescored as 1, each "5" is rescored as 10, and each "B" is rescored as 50 in the N-best list of error sequences lattice 801, different values for the "C", "5", and "B" labels can be used in other embodiments of speech recognition error detection method 300. Further, the labels can be rescored by the metacost matrix module 212 using the equation:

$$\text{revised}_t = \arg\max(\text{cost}_{t,i} \times P_i) \quad [1]$$

where:
t is the predicted label of the word;
cost is n×n, with n being the number of available labels (e.g. "Correct", "Major", and "Minor");
i∈[Correct, Major, Minor]; and
$P_i$ is the marginal probability score of a candidate label.

Figure 10:
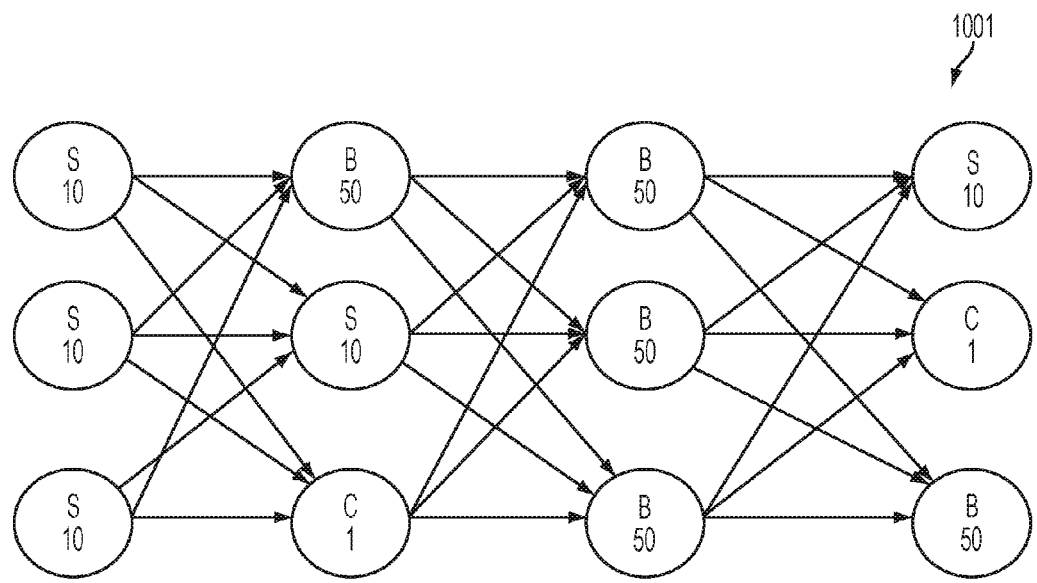
FIG. 10 is an illustrative example of a rescored N-best list error sequence label lattice for the array of rescored N-best list error sequence labels of FIG. 9 in accordance with an embodiment of the present application.

FIG. 10 is an illustrative example of a rescored N-best list error sequence label lattice 1001 for the array of rescored N-best list error sequence labels 901 of FIG. 9 in accordance with an embodiment of the present application. The rescored N-best list error sequence label lattice 1001 is a lattice based on the array of rescored N-best list error sequence labels 901. The best rescored error sequence is selected from the rescored N-best list error sequence label lattice 1001 using the ROVER module 214 in block S325. ROVER is useful in minimizing automated speech recognition error.

III. Illustrative Experiments

Illustrative experiments implementing the system 102 and method 300 for speech recognition error detection discussed above will now be described. Two experiments were carried out to answer two questions: (1) how well the speech recognition error detection method 300 detects important errors in the generated text sentence, and (2) how well the speech recognition error detection method 300 maximizes the correction of major errors in the generated text sentence. The first experiment compares the major versus minor error detection of the speech recognition error detection method 300, used by the speech recognition error detection system 102, to other baseline methods. The goal of major versus minor error detection is to accurately label whether the word is "Correct", includes a "Major" error, or includes a "Minor" error. Four models are compared in this experiment, namely a (i) Majority baseline, (ii) Rule Based baseline, (iii) 2-Way Label, and (iv) 3-Way Label.

The (i) Majority baseline method labels every word of the generated text sentence as "Correct" (majority label). This is a simple and standard baseline used in a label-imbalance data setting.

The (ii) Rule Based baseline method is a standard rule-based approach to determine errors using automated speech recognition confidence scores. The confidence score for each word of the generated text sentence is computed in accordance with block S410 in FIG. 5. A confidence score threshold, optimized using 10-fold-cross-validation, labels each word as either "Correct" or "Error", on a word-by-word basis. If a word is labeled as an "Error", it is relabeled as a "Major" error if the part of speech tag is a noun, pronoun, or verb. Otherwise, a word labeled an "Error" is relabeled as a "Minor" error.

The (iii) 2-Way Label baseline method is a two-step baseline CRF model, which first uses the full set of features described in conjunction with block S410 in FIG. 5, and labels each word of the generated text sentence as "Correct" or "Error", on a word-by-word basis in accordance with the 1-best hypothesis. If a word is labeled as an "Error", it is relabeled as a "Major" error or "Minor" error depending on the predicted part of speech tag for the word. A word is relabeled as a "Major" error when the word is a noun, proper-noun, or a verb. Otherwise, a word labeled an "Error" is relabeled as a "Minor" error. The purpose of this baseline is to show that, although major errors are mostly nouns, proper-nouns, and verbs, the determination as to whether an error is a "Major" error or "Minor" error cannot be made solely using the part of speech information for a word.

The (iv) 3-Way Label method is the CRF model of the CRF module 208 of the speech recognition error detection method 300, as performed by the speech recognition error detection system 102. The 3-Way label is detailed in block S405-S415 of FIG. 5, where the CRF module 208 labels each word of the generated text sentence as "Correct, "Major" error, or "Minor" error, on a word-by-word basis. For the purpose of this experiment, only the 1-best hypothesis error sequence is used, as opposed to the N-best list of predicted error sequences.

The objective of this first experiment is to better discriminate between "Major" error and "Minor" errors. During evaluation of the methods in the first experiment, the "Confirm" dialog action is accepted only when the detected error is correct; otherwise the "Confirm" dialog action is not accepted. The details of this experiment are shown in Tables 1(a) and 1(b) below.

TABLE 1(a)

| Class | Majority | Rule Based | 2-Way Label | 3-Way Label |
|---|---|---|---|---|
| Correct | 95.3 | 92.5 | 95.7 | 95.3 |
| Major | 0.0 | 21.1 | 18.6 | 23.4 |
| Minor | 0.0 | 12.3 | 14.3 | 15.5 |
| All | 86.5 | 86.9 | 89.4 | 88.4 |

Table 1(a) shows the Word level Action-Selection F-score (%) of the 3-Way Label method against the Majority, Rule Based, and 2-Way label baseline methods. Table 1(a) shows that the 3-Way Label method is significantly better than (p<0.01) baseline methods in detecting major errors. It is better by a margin of 23.4% (0 to 23.4) than Majority, 2.3% (21.1 to 23.4) better than Rule Based, and 4.7% (18.6 to 23.4) than 2-Way Label. In overall accuracy, 3-Way Label outperforms Majority by 1.8% (86.5 to 88.4) and Rule Based by 1.5% (86.9 to 88.4).

TABLE 1(b)

| Action | | Majority | Rule Based | 2-Way Label | 3-Way Label |
|---|---|---|---|---|---|
| Continue | | 78.1 | 65.0 | 78.4 | 80.2 |
| Correction (Conf + Rept) | | 0.0 | 18.0 | 17.3 | 23.0 |
| | Confirm | 0.0 | 20.0 | 19.1 | 23.8 |
| | Repeat | 0.0 | 2.2 | 2.4 | 16.3 |
| All | | 50.0 | 48.5 | 56.5 | 59.7 |

Table 1(b) shows the Sentence level Action-Selection F-score (%) of the 3-Way Label method against the Majority, Rule Based, and 2-Way label baseline methods. Table 1(b) shows that the 3-Way Label method performs much better than the 2-Way baseline in selecting actions. The 3-Way Label method improves the action selection by 3% over the 2-Way label method. Overall, the 3-Way Label method improves the action selection and outperforms (p<0.01) both the Majority baseline and the Rule Based baseline by 2% at error detection (86.5 to 88.4). Therefore, the 3-Way Label method of the method 300 outperforms the Majority baseline method, Rule Based baseline method, and 2-Way Label baseline method.

The second experiment compares the optimization of the error detection process to improve the dialog action selection of the speech recognition error detection method 300, used by the speech recognition error detection system 102, to other baseline methods. The optimization of the error detection process helps to minimize the false alarms by clarifying major errors, which in turn improves the dialog action selection. This second experiment compares three models with the previously discussed 3-Way Label method. The three models are (i) 3-Way Voted, (ii) 3-Way Action Optimized, and (iii) 3-Way Voted Action Optimized. 3-Way Voted takes the N-best error sequences, combines them using the ROVER voting algorithm, and finally uses the voted error sequence to select an action. 3-Way Action Optimized takes the 1-best error sequence and applies optimal metacosts as shown in FIG. 9. 3-Way Voted Action Optimized applies optimal metacosts to each of the N-best list of predicted error sequences using the metacost matrix module 212, as shown in S320 of FIG. 3 and FIG. 9. The ROVER voting algorithm is then applied to the N-best list of predicted error sequences using the ROVER module 214 to select the best error sequences, as shown in S325 of FIG. 3 and FIG. 10. Tables 2(a) and 2(b) below show the details of this second experiment.

TABLE 2(a)

| Class | 3-Way Label | 3-Way Voted | 3-Way Action Optimized | 3-Way Voted Action Optimized |
|---|---|---|---|---|
| Correct | 95.2 | 95.5 | 95.1 | 94.8 |
| Major | 23.4 | 24.1 | 27.2 | 28.3 |
| Minor | 15.5 | 16.5 | 18.9 | 19.0 |
| All | 88.4 | 89.5 | 89.4 | 89.3 |

TABLE 2(b)

| Action | | 3-Way Label | 3-Way Voted | 3-Way Action Optimized | 3-Way Voted Action Optimized |
|---|---|---|---|---|---|
| Continue | | 80.2 | 78.3 | 79.1 | 78.2 |
| Correction (Conf + Rept) | | 23.0 | 23.9 | 27.2 | 28.4 |
| | Confirm | 23.8 | 25.0 | 27.8 | 28.2 |
| | Repeat | 16.3 | 14.5 | 22.6 | 30.3 |
| All | | 59.7 | 59.8 | 60.0 | 60.1 |

Table 2(b) shows the 3-Way Voted Action Optimized method produces a significant (p<0.01) improvement in predicting corrective-actions (Confirm and Repeat) when compared to the 3-Way Label method, without degrading overall performance (59.7 to 60.1). Further, the 3-Way Voted Action Optimized method outperforms the 3-Way Label method by 5% (23.8 to 28.2) at the "Confirm" dialog action, and by 14% (16.3 to 30.3) at the "Repeat" dialog action. The average absolute improvement on the corrective action of the 3-Way Voted Action Optimized method compared to the 3-Way Label method is 5% (23.0 to 28.4). Further, when the predicted label is "Correct" the optimized metacosts are [1, 3, 2] for [Correct, Major Minor] labels. This shows that missing major errors are more severe than missing minor errors. The table 2(b) results also show that the intermediate methods, 3-Way Voted and 3-Way Action Optimized, also outperform the 3-Way Label method. Therefore, this second experiment shows that the combining a voting algorithm and metacosts boost the performance of the N-best action optimized method, such as is done in the method 300 of recognizing errors in a short message.

Table 2(a) shows that the 3-Way Voted Action Optimized method significantly (p<0.01) improves the detection of "Major" errors by 5% (23.4 to 28.3), "Minor" errors by 4% (15.5 to 19.0), and overall error detection by 1% (88.4 to 89.3). In summary, the second experiment demonstrates that the 3-Way Voted Action Optimized method improves the corrective action selection and significantly (p<0.01) improves the overall action selection (59.7 to 60.1) and error detection (88.4 to 89.3). Therefore, this second experiment shows that the combining a voting algorithm and metacosts with an N-best action optimized method, such as is done in the method 300 of recognizing errors in a short message, improves the corrective action selection and significantly (p<0.01) improves the overall action selection (59.7 to 60.1) and error detection (88.4 to 89.3).

Thus, disclosed above are embodiments of a system 102 and method 300 of recognizing errors in a short message using an audio input device 104 to receive an utterance of the short message, generating an N-best list of predicted error sequences for the text sentence using a CRF module 208, where each word of the text sentence is assigned a label in each of the predicted error sequences, and each label is assigned a probability score. The predicted error sequence labels are rescored using a metacost matrix module 212, the best rescored error sequence from the N-best list of predicted error sequences is selected using a ROVER module 214, and a dialog action is executed by a dialog action module 218 based on the best rescored error sequence and the dialog action policy.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer implemented method for speech recognition error detection, the method comprising:
    analyzing an utterance received from an audio input device;
    generating a text sentence of one or more words based on the utterance;
    generating a N-best list of predicted error sequences of the text sentence, wherein each of the one or more words of the text sentence is assigned a label in the N-best list of predicted error sequences, wherein the label represents a likelihood of error that is associated with each word of the one of more words of the text sentence, wherein the label is assigned a probability score indicative of a probability that the label is accurate, wherein the probability score for the label is determined by a weighted sum of at least two word features;
    rescoring each label of the N-best list of the predicted error sequences, wherein rescoring each label of the N-best list of predicted error sequences comprises using optimal metacost parameters to rescore each label, wherein the optimal metacost parameters are parameters of a metacost matrix;
    selecting a best rescored error sequence from the N-best list of the predicted error sequences based on rescored labels; and
    executing a dialog action based on the best rescored error sequence and a dialog action policy, wherein the dialog action policy indicates the dialog action based on the rescored labels of the best rescored error sequence, wherein executing the dialog action includes controlling an electronic computing device to execute at least one of: playing back of at least a portion of the text sentence and requesting a confirmation of accuracy of the text sentence when the best rescored error sequence comprises a major error, and discarding the text sentence and requesting to repeat the utterance when the best rescored error sequence comprises at least two of the major errors, wherein the best rescored error sequence comprises the major error when the one or more words of the text sentence include a noun, a proper-noun, or a verb, wherein executing the dialog action includes controlling the electronic computing device to compare the dialog action of the best rescored error sequence to a previously determined dialog action of a previously selected best rescored error sequence to determine if the dialog action of the best rescored error sequence is less or more severe than the previously determined dialog action policy of the previously selected best rescored error sequence, wherein the electronic computing device is controlled to update optimal metacost parameters of a metacost matrix when it is determined that the dialog action of the best rescored error sequence is more severe than the previously determined dialog action policy of the previously selected best rescored error sequence.

2. The computer implemented method of claim 1, wherein each label is a major error label, a minor error label, or a correct label, wherein the dialog action policy indicates the dialog action based on a number of major error labels.

3. The computer implemented method of claim 2, wherein rescoring each label of the N-best list of predicted error sequences comprises applying a randomized grid search to use randomized metacost parameters to rescore each label in a N-best list of error sequences lattice, wherein the randomized metacost parameters are parameters of the metacost matrix.

4. The computer implemented method of claim 1, wherein controlling the electronic computing device to update the optimal metacost parameters includes applying a random adjustment to the optimal metacost parameters.

5. The computer implemented method of claim 1, wherein executing the dialog action includes controlling the electronic computing device to execute the dialog action based on the best rescored error sequence when it is determined that the dialog action of the best rescored error sequence is less severe than the previously determined dialog action policy of the previously selected best rescored error sequence.

6. The computer implemented method of claim 2, wherein the dialog action policy indicates the dialog action of playing back at least the portion of the text sentence and requesting the confirmation of accuracy when the best rescored error sequence comprises the major error label, and the dialog action policy indicates the dialog action of discarding the text sentence and requesting the repeat of the utterance when the best rescored error sequence comprises at least two major error labels.

7. The computer implemented method of claim 1, wherein
    the word features include lexical features, automated speech recognition features, syntactic features, and subword features;
    the lexical features include at least one of the word in the text sentence and a position of the word in the text sentence;
    the automated speech recognition features include at least one of a posterior confidence of an accuracy of the word in the text sentence, a duration of time for the word in the utterance, a presence of an ngram of the word in a language model, and a ratio of alternative nodes to a current node in a word confusion network;
    the syntactic features include at least one of a part of speech tag for the word in the text sentence, a part of speech confidence for the word in the text sentence, and a chunk label for the word in the text sentence; and
    the subword features include a presence of a subword in a timeframe of an output of a hybrid decoder module.

8. A non-transitory computer-readable storage medium storing executable code for speech recognition error detection, the code when executed by a processor performs actions comprising:
    analyzing an utterance received from an audio input device;
    generating a text sentence of one or more words based on the utterance;
    generating a N-best list of predicted error sequences of the text sentence, wherein each of the one or more words of the text sentence is assigned a label in the N-best list of predicted error sequences, wherein the label represents a likelihood of error that is associated with each word of the one of more words of the text sentence, wherein the label is assigned a probability score indicative of a probability that the label is accurate, wherein the probability score for the label is determined by a weighted sum of at least two word features;
    rescoring each label of the N-best list of the predicted error sequences, wherein rescoring each label of the N-best list of predicted error sequences comprises using optimal metacost parameters to rescore each label, wherein the optimal metacost parameters are parameters of a metacost matrix;
    selecting a best rescored error sequence from the N-best list of the predicted error sequences based on rescored labels; and executing a dialog action based on the best rescored error sequence and a dialog action policy, wherein the dialog action policy indicates the dialog action based on the rescored labels of the best rescored error sequence, wherein executing the dialog action includes controlling an electronic computing device to execute at least one of: playing back of at least a portion of the text sentence and requesting a confirmation of accuracy of the text sentence when the best rescored error sequence comprises a major error, and discarding the text sentence and requesting to repeat the utterance when the best rescored error sequence comprises at least two of the major errors, wherein the best rescored error sequence comprises the major error when the one or more words of the text sentence include a noun, a proper-noun, or a verb, wherein executing the dialog action includes controlling the electronic computing device to compare the dialog action of the best rescored error sequence to a previously determined dialog action of a previously selected best rescored error sequence to determine if the dialog action of the best rescored error sequence is less or more severe than the previously determined dialog action policy of the previously selected best rescored error sequence, wherein the electronic computing device is controlled to update optimal metacost parameters of a metacost matrix when it is determined that the dialog action of the best rescored error sequence is more severe than the previously determined dialog action policy of the previously selected best rescored error sequence.

9. The non-transitory computer-readable storage medium of claim 8, wherein each label is a major error label, a minor error label, or a correct label, wherein the dialog action policy indicates the dialog action based on a number of major error labels.

10. The non-transitory computer-readable storage medium of claim 9, wherein rescoring each label of the N-best list of predicted error sequences comprises applying a randomized grid search to use randomized metacost parameters to rescore each label in a N-best list of error sequences lattice, wherein the randomized metacost parameters are parameters of the metacost matrix.

11. The non-transitory computer-readable storage medium of claim 8, wherein controlling the electronic computing device to update the optimal metacost parameters includes applying a random adjustment to the optimal metacost parameters.

12. The non-transitory computer-readable storage medium of claim 8, wherein executing the dialog action includes controlling the electronic computing device to execute the dialog action based on the best rescored error sequence when it is determined that the dialog action of the best rescored error sequence is less severe than the previously determined dialog action policy of the previously selected best rescored error sequence.

13. The non-transitory computer-readable storage medium of claim 9, wherein the dialog action policy indicates the dialog action of playing back at least the portion of the text sentence and requesting a confirmation of accuracy when the best rescored error sequence comprises the major error label, and the dialog action policy indicates the dialog action of discarding the text sentence and requesting the repeat of the utterance when the best rescored error sequence comprises at least two major error labels.

14. The non-transitory computer-readable storage medium of claim 8, wherein:

the word features include lexical features, automated speech recognition features, syntactic features, and subword features;

the lexical features include at least one of the word in the text sentence and a position of the word in the text sentence;

the automated speech recognition features include at least one of a posterior confidence of an accuracy of the word in the text sentence, a duration of time for the word in the utterance, a presence of an ngram of the word in a language model, and a ratio of alternative nodes to a current node in a word confusion network;

the syntactic features include at least one of a part of speech tag for the word in the text sentence, a part of speech confidence for the word in the text sentence, and a chunk label for the word in the text sentence; and the subword features include a presence of a subword in a timeframe of an output of a hybrid decoder module.

15. A speech recognition error detection system, the system comprising:

a computer processor; and a computer readable storage medium storing executable code when executed by the computer processor performs actions comprising:

analyzing an utterance received from an audio input device;

generating a text sentence of one or more words based on the utterance;

generating a N-best list of predicted error sequences of the generated text sentence, wherein each of the one or more words of the text sentence is assigned a label in the N-best list of predicted error sequences, wherein the label represents a likelihood of error that is associated with each word of the one of more words of the text sentence, wherein the label is assigned a probability score indicative of a probability that the label is accurate, wherein the probability score for the label is determined by a weighted sum of at least two word features;

rescoring each label of the N-best list of the predicted error sequences, wherein rescoring each label of the N-best list of predicted error sequences comprises using optimal metacost parameters to rescore each label, wherein the optimal metacost parameters are parameters of a metacost matrix; and selecting a best rescored error sequence from the N-best list of the predicted error sequences based on rescored labels; and executing a dialog action based on the best rescored error sequence and a dialog action policy, wherein the dialog action policy indicates the dialog action based on the rescored labels of the best rescored error sequence, wherein executing the dialog action includes controlling an electronic computing device to execute at least one of: playing back of at least a portion of the text sentence and requesting a confirmation of accuracy of the text sentence when the best rescored error sequence comprises a major error, and discarding the text sentence and requesting to repeat the utterance when the best rescored error sequence comprises at least two of the major errors, wherein the best rescored error sequence comprises the major error when the one or more words of the text sentence include a noun, a proper-noun, or a verb, wherein executing the dialog action includes controlling the electronic computing device to compare the dialog action of the best rescored error sequence to a previously determined dialog action of a previously selected best rescored error sequence to determine if the dialog action of the best rescored error sequence is less or more severe than the previously determined dialog action policy of the previously selected best rescored error sequence, wherein the electronic computing device is controlled to update optimal metacost parameters of a metacost matrix when it is determined that the dialog action of the best rescored error sequence is more severe than the previously determined dialog action policy of the previously selected best rescored error sequence.

16. The speech recognition error detection system of claim 15, wherein rescoring the labels of the N-best list of predicted error sequences comprises using a metacost matrix module and optimal metacost parameters to rescore each label, wherein each label is a major error label, a minor error label, or a correct label, wherein the metacost matrix module is a module that accesses metacost parameters of the metacost matrix;

and wherein the dialog action policy indicates the dialog action of playing back the text sentence and requesting the confirmation of accuracy when the best rescored error sequence comprises the major error label, and the dialog action policy indicates the dialog action of discarding the text sentence and requesting the repeat of the utterance when the best rescored error sequence comprises at least two of the major error labels.

17. The speech recognition error detection system of claim 15, wherein controlling the electronic computing device to update the optimal metacost parameters includes applying a random adjustment to the optimal metacost parameters; and controlling the electronic computing device to execute the dialog action based on the best rescored error sequence when it is determined that the dialog action of the best rescored error sequence is less severe than the previously determined dialog action policy of the previously selected best rescored error sequence.

18. The speech recognition error detection system of claim 15, wherein the word features include lexical features, automated speech recognition features, syntactic features, and subword features;

the lexical features include at least one of the word in the text sentence and a position of the word in the text sentence;

the automated speech recognition features include at least one of a posterior confidence of an accuracy of the word in the text sentence, a duration of time for the word in the utterance, a presence of an ngram of the word in a language model, and a ratio of alternative nodes to a current node in a word confusion network;

the syntactic features include at least one of a part of speech tag for the word in the text sentence, a part of speech confidence for the word in the text sentence, and a chunk label for the word in the text sentence; and the subword features include a presence of a subword in a timeframe of an output of a hybrid decoder module.

* * * * *